Jan. 1, 1935.  W. DZUS  1,986,329

FASTENING DEVICE

Filed Dec. 20, 1933

WITNESS
Chris Feinle.

INVENTOR
William Dzus
BY
Munn, Anderson, Stanley, Foster & Liddy
ATTORNEY

Patented Jan. 1, 1935

1,986,329

UNITED STATES PATENT OFFICE 1,986,329

FASTENING DEVICE

William Dzus, West Islip, N. Y.

Application December 20, 1933, Serial No. 703,294

2 Claims. (Cl. 85—5)

This invention relates to an improvement in fastening devices consisting of cooperative elements which may be used for detachably fastening or securing to each other, separate parts or plates, such as parts of aircraft cowling, automobile license plates, and other parts, and in cases where quickly attachable and detachable fastenings are to be made.

The invention consists of the features specified in the following description, defined in the appended claims, and illustrated in the accompanying drawing, in which Figure 1 shows a fastening device of the invention in use;

Figure 1:
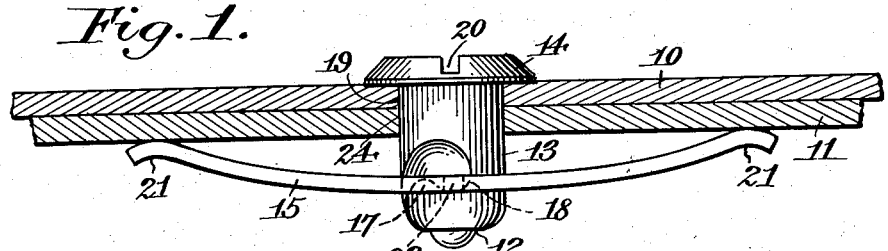
Figure 2:
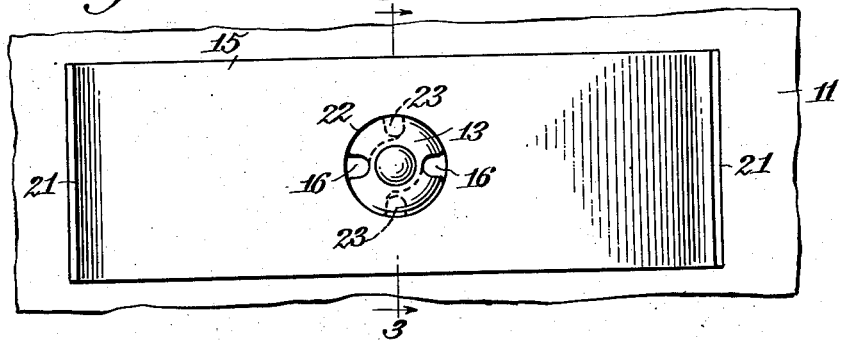
Figure 2 is a side view.
Figure 3:
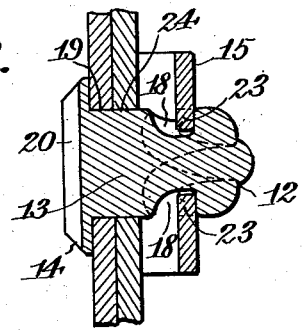
Figure 3 is a section on the line 3—3 of Figure 2.

Referring to Figures 1 to 3 inclusive, the form of fastener shown therein is applied, by way of example, to separate parts or plates 10 and 11 of an aircraft cowling, which are fastened together by a device of the invention. The device includes a fastening element 12 in the form of a button consisting of a shank 13 having a head 14 on one end. The shank 13 has bayonet grooves opposite each other to receive portions of a cooperative fastening element 15. The entrance branch 16 of each groove opens through the end of the shank opposite that having the head 14, the said branch 16 being spiral with respect to the axis of the shank 13. One wall of the groove has a projection 17, forming a continuation of said wall adjacent the inner terminus 18 of the groove, the terminus 18 of one groove being in transverse alignment with the terminus 18 of the other groove. The shank 13 of the element 12 is received in a hole 19 put in the plate 10, so that the element 12 will extend through the plate 10 with its head 14 bearing against the plate, and so that the element may be turned or rotated when positioned as stated. The head 14 of the element 12 has a kerf 20 to accommodate a suitable tool for the purpose of turning or rotating the element 12.

The element 15 consists of a piece of spring or resilient metal cut to the desired shape and size, the same being rectangular in the present instance, and also being bowed longitudinally, while the ends thereof are curled, as at 21. The element has a central opening 22 equal to or slightly larger in diameter than the diameter of the shank 13. Projections 23, integral with the element 15, are disposed diametrically opposite each other and extend into the opening 22. The plate 11 has a hole 24 therein similar to the hole 19 in the plate 10, to receive therethrough the shank 13 of the element 12.

When it is desired to fasten the parts 10 and 11 to each other, the parts are brought together side by side, after which the shank of the element 12 is extended through the holes 19 and 24. The element 15 is then placed so that its ends 21 are in contact with the part 11. The element 12 is then turned so that the entrance branches 16 of the grooves will register with the projections 23 to enter the latter in said branches 16. Then by imparting turning or rotational movement to the element 12, by the use of a screwdriver entered in the kerf 20, the projections will be drawn into the termini 18 past the projections 17. In accomplishing this result, the walls of the branches 16 function as cams. When the element 12 is engaged with the element 15, as explained, the parts 10 and 11 will be securely fastened together. The projections 17 will resist retrograde rotation of the element 12 with respect to the element 15, thus preventing unintentional separation of the elements 12 and 15, and therefore, the parts 10 and 11. By holding the element 15 and then turning the element 12 with the screw-driver, the element 15 may be flexed sufficiently by the action of the projections 17 on the projections 23, thereby disengaging the projections 23 from the grooves in the shank 13. In this manner the element 12 will be separated from the element 15 and the part 10 may then be separated from the part 11. The element 12 is turned one-fourth of a revolution to engage the projections 23 in the termini 18 in fastening two parts to each other, and also in disengaging the projections 23 from the grooves to unfasten the parts. Thus, two parts or plates may be quickly and easily fastened to each other and unfastened.

Figure 4:
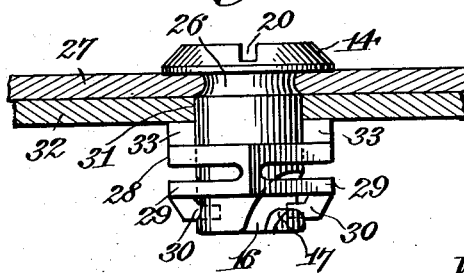
Figure 4 is a view showing a fastener of the invention embodying modifications.

In Figure 4, there is shown a fastening element 25 similar to the element 12 with the exception that the shank of the element 25 has a groove 26 into which the material of a plate 27 may be extended, so that the element 25 may be turned or rotated while being held against axial movement. In other respects, the element 25 is similar to the element 12, and corresponding features are given similar reference numerals. In lieu of the fastening element 15, use may be made of an element 28 in the form of a nut, so constructed as to provide resilient laterally exending members 29 having projections 30 respectively disposed diametrically opposite each other comparable to the projections 23 of the element 15. The shank 13 of the element 25 may be extended through a hole 31 in a part or plate 32, after which the element 25 may be arranged on the shank 13 with its projection 30 disposed in the grooves respectively, after which the element 25 may be forcefully rotated by the use of a screw-driver, causing the members 29 to flex until the projections 30 have cleared the projection 17 and are finally engaged in the termini. The elements 25 and 28 may be readily separated by turning the element 25 relatively to the element 28 while holding the latter as will be obvious. If desired, a plate may be used having recesses or the like to receive lugs 33 on the element 28 to prevent the latter from turning during the fastening and unfastening operations.

I claim:—

1. A fastening device comprising separate co-engaging fastening elements, one of said elements consisting of a piece of bowed spring material having an opening therein and a projection in said opening, the second of said elements being applicable for turning movement to a part to be fastened to a second part which may be engaged by said first element, said second element being so formed as to project through the opening in said first element and having a spirally grooved portion for interlocking engagement with said projection by the turning movement of the second element, to detachably fasten said parts together.

2. A fastening device comprising separate fastening elements, one of said elements consisting of a piece of bowed material having an opening therein between its ends and also having a projection in said opening, the second of said elements being applicable for turning movement to a part to be fastened to a second part which may be engaged by the ends of said first element, said second element being so formed as to project through said opening, and being spirally grooved for interlocking engagement with said projection by the turning movement of the second element, to detachably fasten said parts together.

WILLIAM DZUS.